United States Patent
Nakagawa et al.

(10) Patent No.: US 10,775,778 B2
(45) Date of Patent: Sep. 15, 2020

(54) INDUSTRIAL PLANT EVALUATION DEVICE AND INDUSTRIAL PLANT EVALUATION METHOD

(71) Applicant: MITSUBISHI HEAVY INDUSTRIES, LTD., Tokyo (JP)

(72) Inventors: Yosuke Nakagawa, Tokyo (JP); Naohiko Ishibashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 120 days.

(21) Appl. No.: 16/070,178

(22) PCT Filed: Jan. 12, 2017

(86) PCT No.: PCT/JP2017/000745
§ 371 (c)(1),
(2) Date: Jul. 13, 2018

(87) PCT Pub. No.: WO2017/122711
PCT Pub. Date: Jul. 20, 2017

(65) Prior Publication Data
US 2019/0018398 A1    Jan. 17, 2019

(30) Foreign Application Priority Data
Jan. 14, 2016 (JP) ................................. 2016-005482

(51) Int. Cl.
G05B 19/418 (2006.01)
G05B 17/02 (2006.01)
G05B 13/04 (2006.01)

(52) U.S. Cl.
CPC ....... G05B 19/41885 (2013.01); G05B 17/02 (2013.01); G05B 13/04 (2013.01);
(Continued)

(58) Field of Classification Search
None
See application file for complete search history.

(56) References Cited

U.S. PATENT DOCUMENTS 5,347,446 A * 9/1994 Iino ...................... G05B 13/048
700/29
5,704,011 A * 12/1997 Hansen ................ G05B 13/026
706/25
(Continued)

FOREIGN PATENT DOCUMENTS

JP    2009-199305 A    9/2009
JP    2009-282804 A    12/2009
(Continued)

OTHER PUBLICATIONS

Extended European Search Report in corresponding European Application No. 17738465.8, dated Aug. 2, 2019 (10 pages).
(Continued)

*Primary Examiner* — Ramesh B Patel
(74) *Attorney, Agent, or Firm* — Osha Liang LLP

(57) ABSTRACT

In order to reduce the calculation cost of industrial plant evaluation, an industrial plant evaluation device 5 comprises: a reception unit 51 configured to receive an actual machine manipulated variable in process control of an industrial plant and an actual machine process variable to be controlled by the process control; an estimation unit 52 configured to determine a process variable as an estimated process variable by using a process model defining a mathematical relationship between a manipulated variable and a process variable in the process control, the process variable as the estimated process variable being obtained by substituting the actual machine manipulated variable for the manipulated variable in the process model; and a comparison unit 53 configured to compare the estimated process
(Continued)

variable and the actual machine process variable with each other.

4 Claims, 5 Drawing Sheets

(52) U.S. Cl.
CPC .............. *G05B 2219/32369* (2013.01); *G05B 2219/39159* (2013.01)

(56) References Cited

U.S. PATENT DOCUMENTS

| | | | | |
|---|---|---|---|---|
| 6,230,486 B1* | 5/2001 | Yasui | .................. | F02D 41/1402 |
| | | | | 123/674 |
| 8,830,052 B2* | 9/2014 | Nakaya | .................... | G08B 5/22 |
| | | | | 340/506 |
| 9,418,371 B2* | 8/2016 | Hansen | ................ | G06Q 10/087 |
| 2004/0073404 A1* | 4/2004 | Brooks | ................ | G05B 19/409 |
| | | | | 702/183 |
| 2007/0208549 A1* | 9/2007 | Blevins | .................. | G05B 17/02 |
| | | | | 703/6 |
| 2013/0147630 A1* | 6/2013 | Nakaya | .................... | G08B 5/22 |
| | | | | 340/691.6 |
| 2015/0261200 A1* | 9/2015 | Blevins | ................... | G06F 30/20 |
| | | | | 700/21 |
| 2016/0282820 A1* | 9/2016 | Perez | .................... | G05B 13/047 |
| 2016/0292188 A1* | 10/2016 | Horn | .................. | G05B 23/0216 |
| 2019/0086909 A1* | 3/2019 | Matsubara | .......... | G05B 23/0235 |
| 2019/0154487 A1* | 5/2019 | Nakagawa | ............. | G05B 23/02 |

FOREIGN PATENT DOCUMENTS

| | | |
|---|---|---|
| JP | 2010-271890 A | 12/2010 |
| JP | 2013-69094 A | 4/2013 |

OTHER PUBLICATIONS

International Search Report for corresponding International Application No. PCT/JP2017/000745, dated Apr. 4, 2017 (1 page).
International Preliminary Report on Patentability for corresponding International Application No. PCT/JP2017/000745, dated Jul. 17, 2018 (6 pages).
Notice of Reasons for Refusal in corresponding Japanese Application No. 2016-005482, dated Feb. 17, 2020 (6 pages).

* cited by examiner

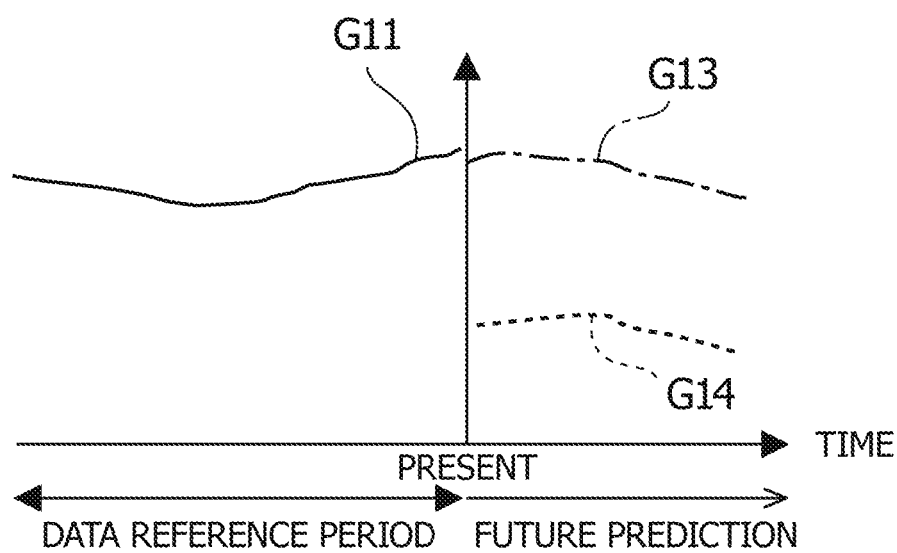

INDUSTRIAL PLANT EVALUATION DEVICE AND INDUSTRIAL PLANT EVALUATION METHOD

TECHNICAL FIELD

The present invention relates to an industrial plant evaluation device and to an industrial plant evaluation method.

BACKGROUND ART

For optimized operation of an industrial plant such as a chemical plant, a simulation using an industrial plant model is sometimes performed. Patent Document 1 discloses a simulation device including a tracking model unit, an identification model unit, an analysis model unit, and a comparison-determination unit.

REFERENCE DOCUMENT LIST

Patent Document

Patent Document 1: JP 2009-282804 A

SUMMARY OF THE INVENTION

Problem to be Solved by the Invention

In Patent Document 1, there is no clear description about an industrial plant manipulated variable such as the opening degree of a valve. However, in order to perform the simulation, calculating the industrial plant manipulated variable is considered necessary. In particular, in cases in which the simulation device is operated online, a model for calculating the industrial plant manipulated variable is necessary. This may increase the overall calculation cost.

An object of the present invention is to overcome such an inconvenience to reduce the calculation cost of industrial plant evaluation.

Means for Solving the Problem

In order to achieve the above-described object, an industrial plant evaluation device according to the present invention comprises: a reception unit configured to receive an actual machine manipulated variable in process control of an industrial plant and an actual machine process variable to be controlled by the process control; an estimation unit configured to determine a process variable as an estimated process variable by using a process model defining a mathematical relationship between a manipulated variable and a process variable in the process control, the process variable as the estimated process variable being obtained by substituting the actual machine manipulated variable for the manipulated variable in the process model; and a comparison unit configured to compare the estimated process variable and the actual machine process variable with each other.

The plant evaluation device may further comprise a smoothing unit configured to smooth the actual machine manipulated variable received by the reception unit. In this case, the estimation unit determines a process variable, as the estimated process variable, obtained by substituting the actual machine manipulated variable smoothed by the smoothing unit for the manipulated variable in the process model.

The plant evaluation device may further comprise a prediction unit configured to predict a future manipulated variable based on the actual machine manipulated variable received by the reception unit and to determine a process variable, as a future process variable, obtained by substituting the future manipulated variable for the manipulated variable in the process model.

The plant evaluation device may further comprise a prediction unit configured to predict a future manipulated variable based on the actual machine manipulated variable smoothed by the smoothing unit and to determine a process variable, as a future process variable, obtained by substituting the future manipulated variable for the manipulated variable in the process model.

In order to achieve the above-described object, an industrial plant evaluation method according to the present invention comprises: a reception step of receiving an actual machine manipulated variable in process control of an industrial plant and an actual machine process variable to be controlled by the process control; an estimation step of determining a process variable as an estimated process variable by using a process model defining a mathematical relationship between a manipulated variable and a process variable in the process control, the process variable as the estimated process variable being obtained by substituting the actual machine manipulated variable for the manipulated variable in the process model; and a comparison step of comparing the estimated process variable and the actual machine process variable with each other.

The industrial plant evaluation method may further comprise a smoothing step of smoothing the actual machine manipulated variable received in the reception step. In this case, the estimation step is a step of determining a process variable, as the estimated process variable, obtained by substituting the actual machine manipulated variable smoothed in the smoothing step for the manipulated variable in the process model.

The plant evaluation method may further comprise a prediction step of predicting a future manipulated variable based on the actual machine manipulated variable received in the reception step and determining a process variable, as a future process variable, obtained by substituting the future manipulated variable for the manipulated variable in the process model.

The plant evaluation method may further comprise a prediction step of predicting a future manipulated variable based on the actual machine manipulated variable smoothed in the smoothing step and determining a process variable, as a future process variable, obtained by substituting the future manipulated variable for the manipulated variable in the process model.

Effects of the Invention

With the present invention, the calculation cost of industrial plant evaluation can be reduced.

BRIEF DESCRIPTION OF THE DRAWINGS

FIG. 9 is a set of graphs illustrating a predicted manipulated variable and process variable.

MODES FOR CARRYING OUT THE INVENTION

Actual Plant

Figure 1:
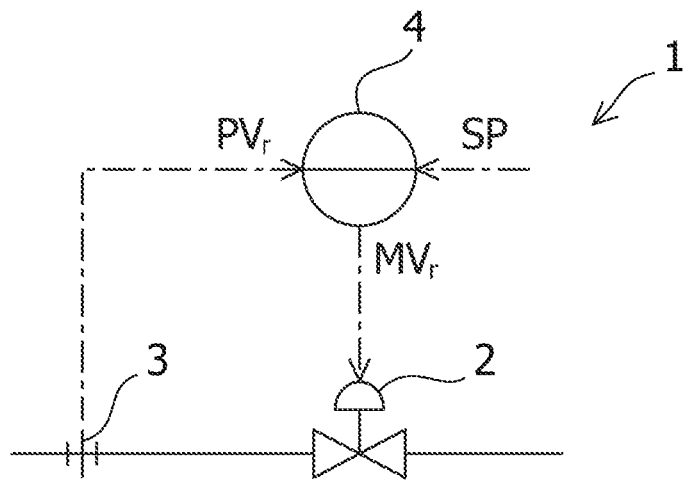
FIG. 1 is an explanatory diagram illustrating the configuration of an actual industrial plant.

First, an example of an industrial plant to be evaluated will be described. As illustrated in FIG. 1, an actual industrial plant 1, which is a real industrial plant, includes a valve 2 with which to adjust the flow rate of a fluid, a flowmeter 3, and a flow controller 4. Each of the valve 2, the flowmeter 3, and the flow controller 4 is an industrial plant instrument.

The valve 2 is operated by the flow controller 4. First, the flow controller 4 receives an input of a set point SP from outside and also receives an input of an actual machine flow rate $PV_r$ measured by the flowmeter 3 from the flowmeter 3. The actual machine flow rate $PV_r$ is one actual machine process variable indicating a state of the actual industrial plant 1. Then, the flow controller 4 calculates an error $e_r$ and an actual machine manipulated variable $MV_r$ of the valve 2 based on the following equations.

[Math. 1]

$$e_r = SP - PV_r \quad (1)$$

$$MV_r = K_p \cdot e_r + \int \frac{e_r}{T_i} dt \quad (2)$$

where $K_p$ is a constant called proportional gain, and $T_i$ is an integral time.

The flow controller 4 sends the calculated actual machine manipulated variable $MV_r$ to the valve 2. The valve 2 is operated based on the actual machine manipulated variable $MV_r$ received from the flow controller 4.

Thus, in the process control of the actual plant 1, the flow controller 4 calculates the actual machine manipulated variable $MV_r$ to make the error $e_r$ zero, that is, to make the actual machine flow rate $PV_r$ equal to the set point SP.

Example of Plant Model

Figure 2:
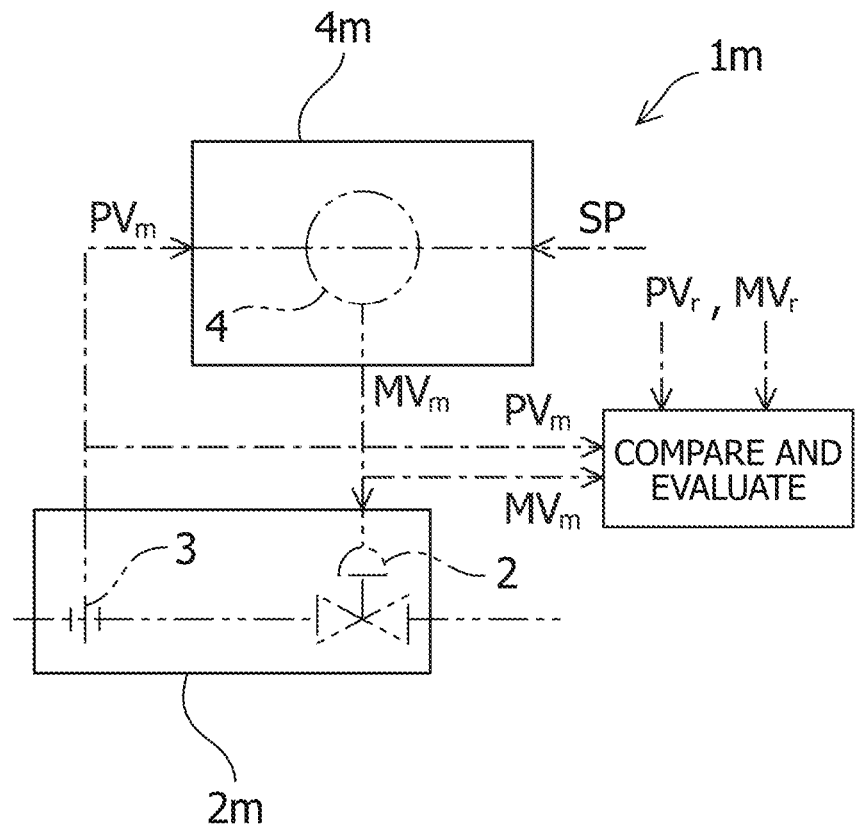
FIG. 2 is an explanatory diagram of an industrial plant model.
Figure 3:
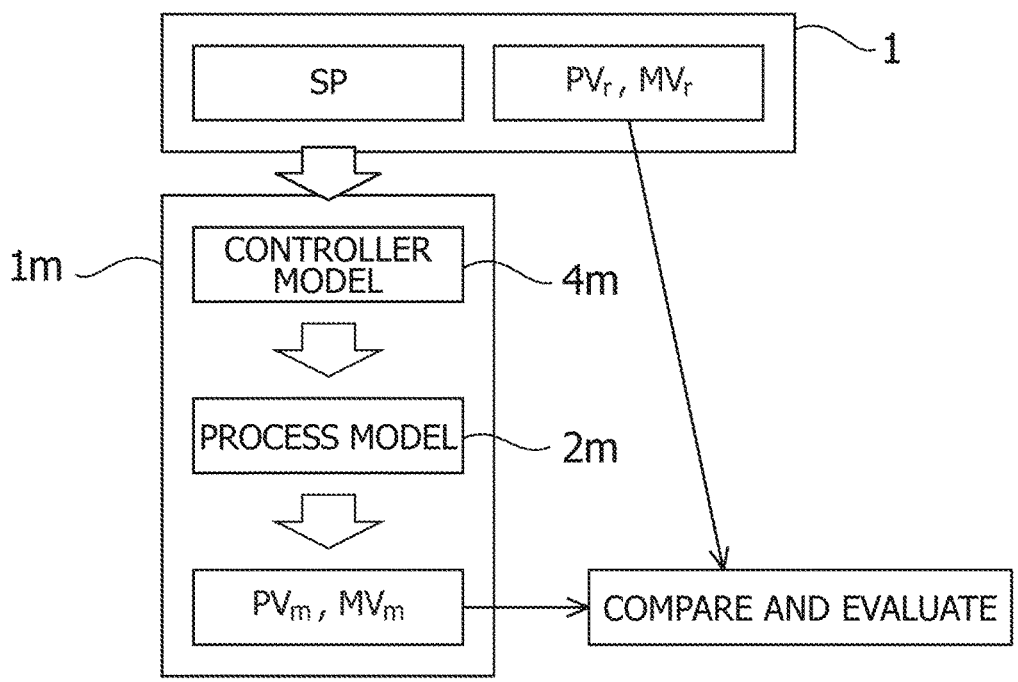
FIG. 3 is an explanatory diagram illustrating the procedure of industrial plant evaluation.

An example of a method of evaluating the actual industrial plant 1 by using an industrial plant model will be described. FIG. 2 and FIG. 3 illustrate an industrial plant model 1m configured to simulate the operation of the actual industrial plant 1. The industrial plant model 1m includes a process model 2m and a controller model 4m.

The process model 2m is a model defining a mathematical relationship between a manipulated variable MV in the process control of the industrial plant and a flow rate (process variable) PV to be controlled by the process control as the following equation.

[Math. 2]

$$PV = MV \cdot \sqrt{\Delta P} \quad (3)$$

where $\Delta P$ is the differential pressure at the valve 2.

The controller model 4m is a model configured to simulate the operation of the flow controller 4 in the actual industrial plant 1. With the controller model 4m, an estimated value $MV_m$ of the manipulated variable (estimated manipulated variable) is expressed as below by using the set point SP for the actual industrial plant 1 and an estimated value $PV_m$ of the flow rate (estimated flow rate) obtained as described later by using the process model 2m.

[Math. 3]

$$e_m = SP - PV_m \quad (4)$$

$$MV_m = K_p \cdot e_m + \int \frac{e_m}{T_i} dt \quad (5)$$

where $e_m$ is an estimated value of the error.

Also, the estimated value $PV_m$ of the flow rate can be determined as the flow rate PV obtained by substituting the estimated value $MV_m$ of the manipulated variable for the manipulated variable MV in the process model 2m with equation (3). In other words, this can be expressed as below.

[Math. 4]

$$PV_m = MV_m \cdot \sqrt{\Delta P} \quad (6)$$

Then, the estimated value $MV_m$ of the manipulated variable, obtained by the controller model 4m, and the actual machine manipulated variable $MV_r$ in the actual industrial plant 1 are compared with each other. This comparison can be done via calculation of the difference between the estimated value $MV_m$ of the manipulated variable and the actual machine manipulated variable $MV_r$ or the like. Moreover, the estimated value $PV_m$ of the flow rate, obtained by the process model 2m, and the actual machine flow rate $PV_r$ in the actual plant 1 are compared with each other. This comparison can be done via calculation of the difference between the estimated value $PV_m$ of the flow rate and the actual machine flow rate $PV_r$. The actual plant 1 is evaluated as in this manner.

Plant evaluation as above needs a controller model in order to obtain an estimated value of a manipulated variable of an industrial plant instrument. Normally, there are a plurality of industrial plant instruments in an industrial plant, and therefore as many controller models as the industrial plant instruments are needed as well. This may increase the overall calculation cost of the industrial plant evaluation.

The present inventor intensively researched the above-expected problem. Embodiments of the present invention based on these will be described below. However, the present invention is not limited by the following embodiments.

First Embodiment

Figure 4:
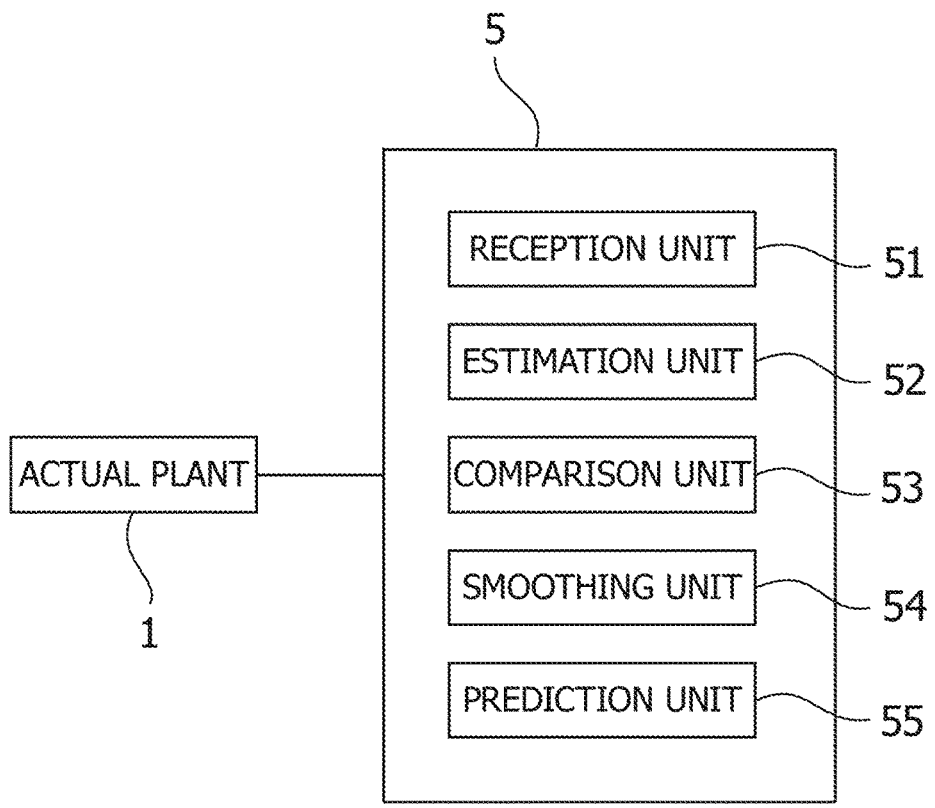
FIG. 4 is an explanatory diagram illustrating an example of the functional configuration of an industrial plant evaluation device.

As illustrated in FIG. 4, an industrial plant evaluation device 5 includes a reception unit 51 configured to receive data from the actual industrial plant 1, an estimation unit 52, and a comparison unit 53. Details of the functions of the estimation unit 52 and the comparison unit 53 will be described later.

Figure 5:
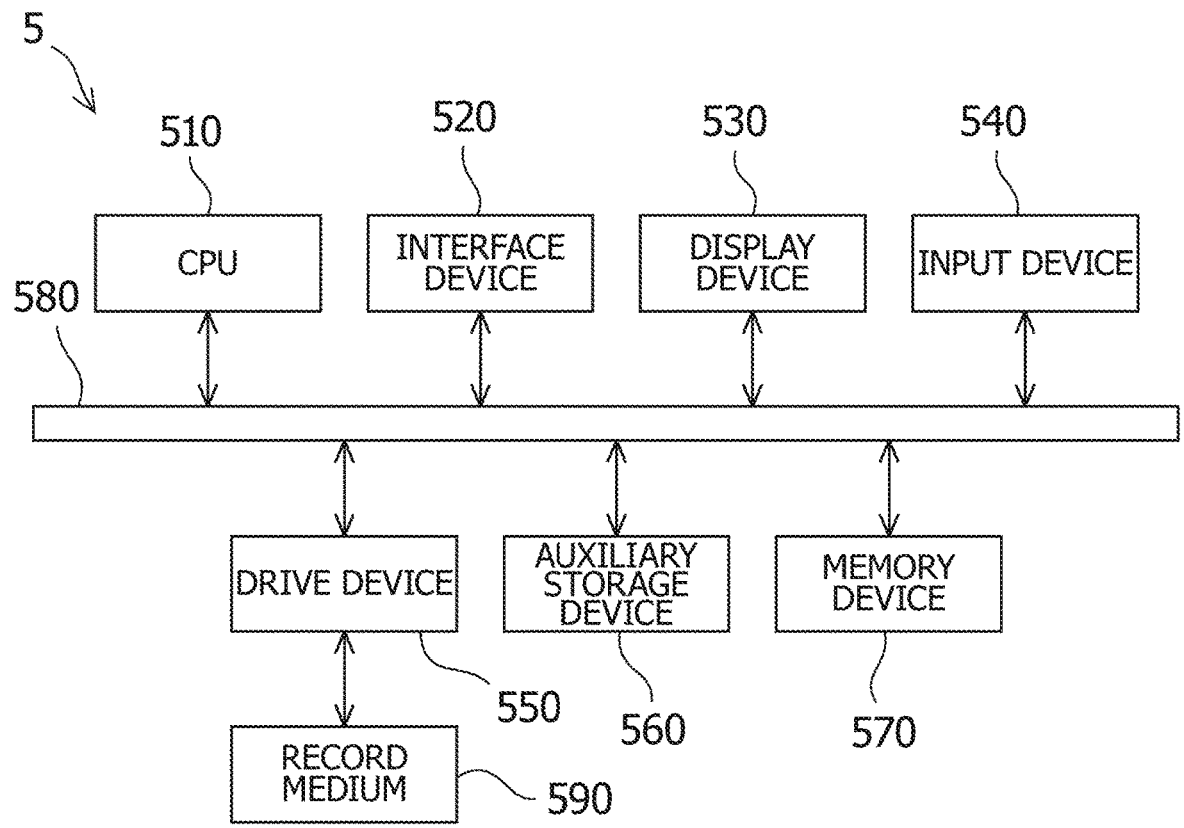
FIG. 5 is an explanatory diagram illustrating an example of the computer hardware configuration of the industrial plant evaluation device.
Figure 6:
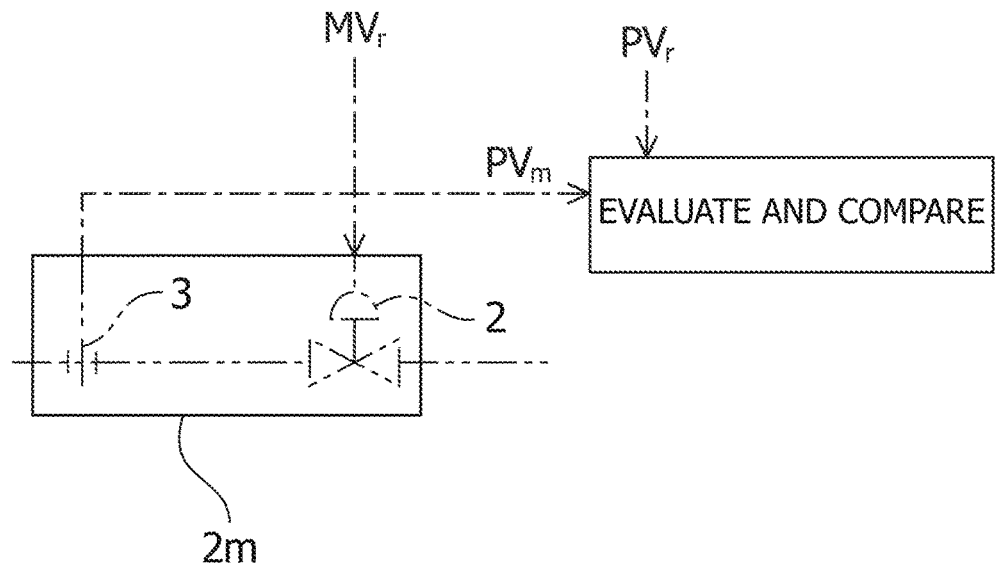
FIG. 6 is an explanatory diagram illustrating processes by an estimation unit and a comparison unit.
Figure 7:
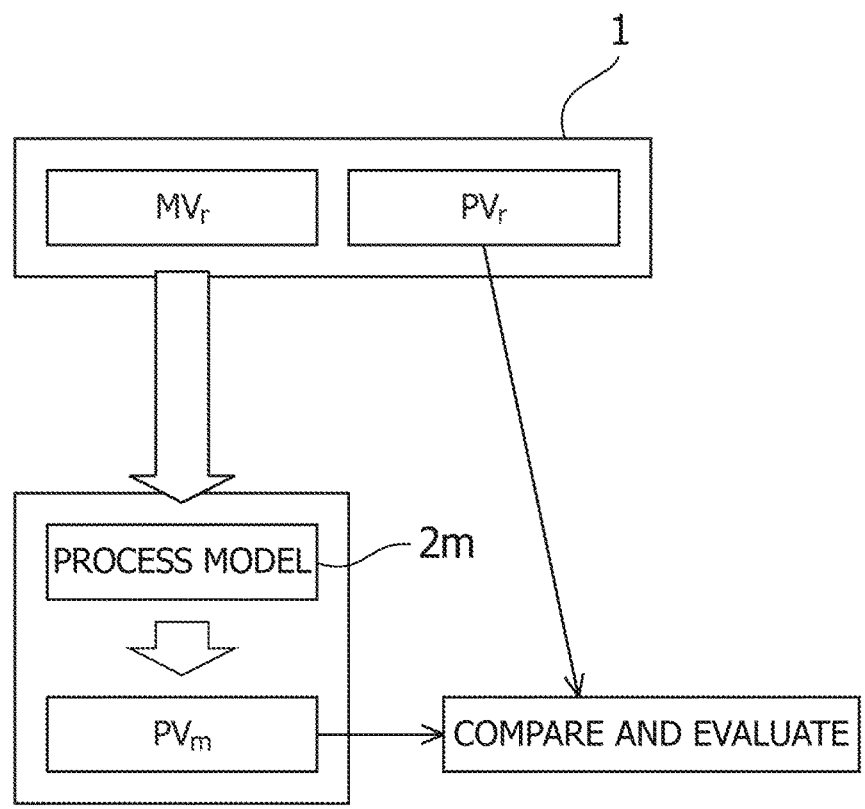
FIG. 7 is an explanatory diagram illustrating the processes by the estimation unit and the comparison unit.

FIG. 5 illustrates an example of the computer hardware configuration of the industrial plant evaluation device 5. The industrial plant evaluation device 5 includes a CPU 510, an interface device 520, a display device 530, an input device 540, a drive device 550, an auxiliary storage device 560, and a memory device 570, and these are connected to each other by a bus 580.

A program configured to implement the function of the industrial plant evaluation device 5 is provided by means of a record medium 590 such as a CD-ROM. As the record medium 590 with the program recorded therein is set in the drive device 550, the program is installed into the auxiliary storage device 560 from the record medium 590 through the drive device 550. The program does not necessarily have to be installed from the record medium 590. Alternatively, the program can be downloaded from another computer through a network. The auxiliary storage device 560 stores the installed program and stores necessary files, data, etc. as well.

The memory device 570 reads the program out of the auxiliary storage device 560 and stores it in response to an instruction to start the program. The CPU 510 implements the function of the industrial plant evaluation device 5 by following the program stored in the memory device 570. The interface device 520 is used as an interface for connecting to another computer through a network. The display device 530 displays a GUI (Graphical User Interface) and the like of the program. The input device 540 is a keyboard, a mouse, and/or the like.

Processing performed by the industrial plant evaluation device 5 will be described below with reference to FIG. 4 to FIG. 7. The reception unit 51 receives the actual machine manipulated variable $MV_r$ and the actual machine flow rate $PV_r$ from the actual industrial plant 1. The received actual machine manipulated variable $MV_r$ and actual machine flow rate $PV_r$ can be stored in the auxiliary storage device 560 if necessary.

Then, the estimation unit 52 determines the flow rate PV, as the estimated value $PV_m$ of the flow rate, obtained by substituting the actual machine manipulated variable $MV_r$ for the manipulated variable MV in the process model 2*m* with equation (3). In other words, this can be expressed as below.

[Math. 5]

$$PV_m = MV_r \cdot \sqrt{\Delta P} \qquad (7)$$

Thereafter, the comparison unit 53 compares the estimated value $PV_m$ of the flow rate and the actual machine flow rate $PV_r$ with each other and evaluates the industrial plant based on the comparison result. This comparison can be done via calculation of the difference between the estimated value $PV_m$ of the flow rate and the actual machine flow rate $PV_r$.

As described above, the actual machine manipulated variable is input into the process model to calculate the estimated value of the flow rate. In this way, an estimated value of the manipulated variable does not need to be calculated. Consequently, no controller model is needed. Accordingly, the calculation cost for the estimated value of the flow rate can be reduced. Further, the estimated value of the flow rate can be calculated faster than the case of using a controller model. The industrial plant evaluation device 5 is particularly effective in cases in which it is operated offline, such as when past industrial plant operation data is analyzed. Note that being offline refers to a state in which the industrial plant evaluation device 5 is not communicatively connected to the actual industrial plant 1.

The computation period of the industrial plant evaluation device (1 second, 100 milliseconds, etc.) is sometimes shorter than the sampling period of the actual machine manipulated variable (10 seconds, 1 minute, etc.). In this case, the actual machine manipulated variable may be interpolated.

Note that in this embodiment, the actual machine manipulated variable is used to calculate the estimated value of the flow rate. For this reason, the estimated values of the present and past flow rates can be calculated. However, a future flow rate cannot be predicted.

Second Embodiment

Figure 8:
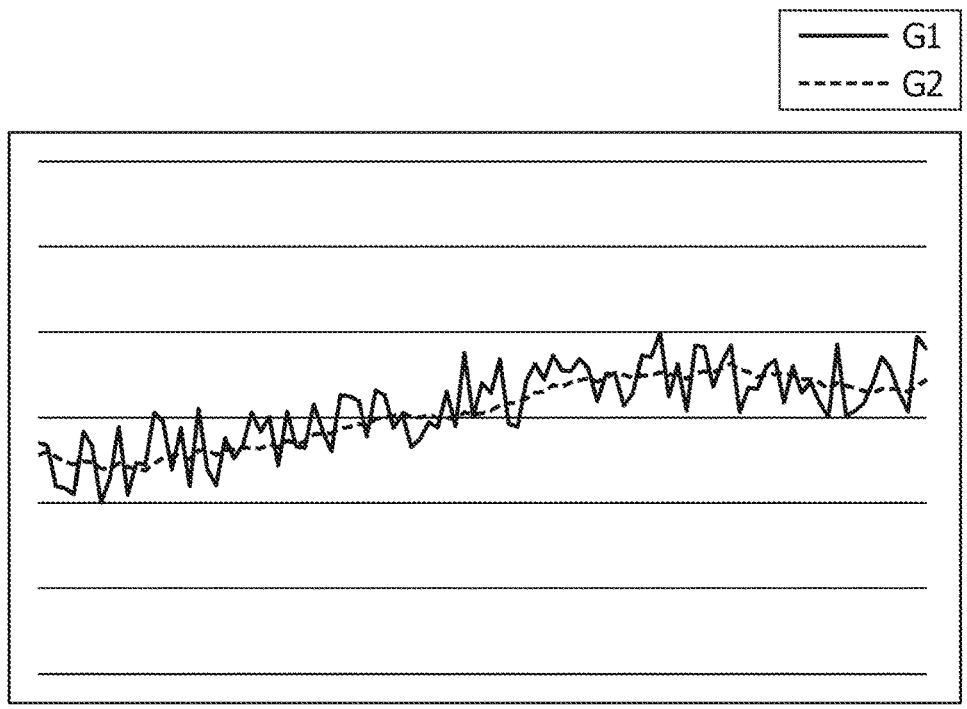
FIG. 8 is a set of graphs illustrating time-series changes in an actual machine manipulated variable before and after smoothing.

The industrial plant evaluation device 5 may further include a smoothing unit 54. This smoothing unit 54 smooths the actual machine manipulated variable $MV_r$ in a case in which the actual machine manipulated variable $MV_r$ contains noise-like small time-series fluctuation. FIG. 8 illustrates a graph G1 indicating a time-series change in the actual machine manipulated variable $MV_r$ before smoothing and a graph G2 indicating a time-series change in the actual machine manipulated variable after the smoothing. Then, the estimation unit 52 determines the flow rate PV, as the estimated value $PV_m$ of the flow rate, obtained by substituting the actual machine manipulated variable smoothed by the smoothing unit 54 for the manipulated variable MV in equation (3).

Time averaging, moving averaging, or the like can be used as the method of smoothing by the smoothing unit 54. The smoothing may be done by increasing the sampling period of the actual machine manipulated variable.

According to this embodiment, it is possible to prevent the estimated value of the flow rate from spreading due to small time-series fluctuation contained in the actual machine manipulated variable. Note that since industrial plants are usually operated under a constant rated load, the manipulated variable does not vary greatly. For this reason, the smoothing by the smoothing unit does not greatly affect the estimation by the estimation unit.

Third Embodiment

The industrial plant evaluation device 5 may further include a prediction unit 55 in addition to the reception unit 51, the estimation unit 52, and the comparison unit 53. This prediction unit 55 predicts a future manipulated variable from past data of the actual machine manipulated variable $MV_r$ received by the reception unit 51. Spline interpolation can be used for the prediction. FIG. 9 illustrates a graph G11 indicating a time-series change in the actual machine manipulated variable $MV_r$ in a past and a graph G13 indicating a future manipulated variable predicted by the prediction unit 55.

The prediction unit further determines the flow rate PV, as a future flow rate, obtained by substituting the predicted future manipulated variable for the manipulated variable MV in equation (3). A graph G14 in FIG. 9 represents the future flow rate thus calculated.

According to this embodiment, it is possible to predict a future manipulated variable and process variable without using a controller model. Further, it is possible to make a prediction reflecting the industrial plant manipulated variable data immediately before the prediction.

Note that the process by the prediction unit can be performed irrespective of the process by the estimation unit or the process by the comparison unit.

The industrial plant evaluation device 5 may further include the prediction unit 55 in addition to the reception unit 51, the estimation unit 52, the comparison unit 53, and the smoothing unit 54. In this case, the prediction unit 55 predicts a future manipulated variable from past data of the actual machine manipulated variable smoothed by the smoothing unit. The prediction unit further determines the flow rate PV, as a future flow rate, obtained by substituting the predicted future manipulated variable for the manipulated variable MV in equation (3). In this case too, the process by the prediction unit can be performed irrespective of the process by the estimation unit or the process by the comparison unit.

Other Matters

Although the flow rate has been taken as an example of the process variable, the process variable is not limited to this. Any measurable variables such as temperature and pressure can be used as the process variable. Moreover, the operation target in the process control is not limited to a valve but can be any industrial plant equipment.

The above-described functional configuration of the industrial plant evaluation device 5 is not limited to the above-described form. For example, some units may be integrated together and implemented or conversely divided into smaller units and implemented.

Each of the above-described embodiments has an aspect of an industrial plant evaluation method executed by the industrial plant evaluation device 5.

Although particular embodiments of the present invention have been described, the present invention is not limited to these embodiments, and various changes based on the technical idea of the present invention are included in the concept of the present invention.

REFERENCE SYMBOL LIST

1 Actual industrial plant
2 Valve
3 Flowmeter
4 Flow controller
1m Industrial plant model
2m Process mode
4m Controller model
SP Set point
$MV_r$ Actual machine manipulated variable
$PV_r$ Actual machine flow rate (actual machine process variable)
$e_r$ Error
MV Manipulated variable
PV Process variable
$MV_m$ Estimated value of manipulated variable (estimated manipulated variable)
$PV_m$ Estimated value of flow rate (estimated flow rate)
$e_m$ Estimated value of error
5 Industrial plant evaluation device
51 Reception unit
52 Estimation unit
53 Comparison unit
54 Smoothing unit
55 Prediction unit

The invention claimed is:

1. An industrial plant evaluation device comprising:
a reception unit configured to receives, from information transmitted from an industrial plant, an actual machine manipulated variable in process control of the industrial plant and an actual machine process variable to be controlled by the process control;
an estimation unit configured to estimate an estimated process variable using a process model defining a mathematical relationship between a manipulated variable and a process variable in the process control, the estimated process variable is obtained by substituting the actual machine manipulated variable for the manipulated variable in the process model;
a comparison unit configured to compare the estimated process variable and the actual machine process variable; and
a prediction unit configured to predict a future manipulated variable based on past data of the actual machine manipulated variable and to determine a future process variable by substituting the future manipulated variable for the manipulated variable in the process model, wherein
a result of a comparison of the estimated process variable and the actual machine process variable by the comparison unit is used to generate an evaluation result of the industrial plant.

2. The industrial plant evaluation device according to claim 1, further comprising:
a smoothing unit configured to smooth the actual machine manipulated variable,
wherein the estimation unit determines the estimated process by substituting the actual machine manipulated variable smoothed by the smoothing unit for the manipulated variable in the process model; and
wherein the prediction unit predicts the future manipulated variable based on the past data of the actual machine manipulated variable smoothed by the smoothing unit.

3. An industrial plant evaluation method comprising:
receiving, from information transmitted from an industrial control plant, an actual machine manipulated variable in process control of the industrial plant and an actual machine process variable to be controlled by the process control;
determining an estimated process variable using a process model defining a mathematical relationship between a manipulated variable and a process variable in the process control, the estimated process variable is obtained by substituting the actual machine manipulated variable for the manipulated variable in the process model;
comparing the estimated process variable and the actual machine process variable;
predicting a future manipulated variable based on past data of the actual machine manipulated variable; and
determining a future process variable by substituting the future manipulated variable for the manipulated variable in the process model, wherein
a result of a comparison of the estimated process variable and the actual machine process variable by the comparison unit is used to generate an evaluation result of the industrial plant.

4. The industrial plant evaluation method according to claim 3, further comprising:
smoothing the actual machine manipulated variable,
wherein the estimating comprises determining the estimated process variable by substituting the actual machine manipulated variable smoothed in the smoothing step for the manipulated variable in the process model; and
wherein the predicting comprises predicting a future manipulated variable based on the past data of the actual machine manipulated variable smoothed in the smoothing step.

* * * * *